United States Patent [19]

Ballenger

[11] 4,082,349
[45] Apr. 4, 1978

[54] COMMERCIAL DUTY HIGH CHAIR

[75] Inventor: William Ballenger, Deerfield, Ill.

[73] Assignee: Central Specialties, Inc., Chicago, Ill.

[21] Appl. No.: 685,930

[22] Filed: May 12, 1976

[51] Int. Cl.² .............................................. A47D 1/00
[52] U.S. Cl. ................................. 297/183; 280/47.35;
 280/47.4; 297/153; 297/192
[58] Field of Search ............... 297/153, 192, 148, 174,
 297/451, 457, DIG. 2, 253, 3, 452, 183;
 280/47.38, 47.35, 47.4, 79.1, 79.2, 79.3

[56] References Cited

U.S. PATENT DOCUMENTS

| | | | |
|---|---|---|---|
| 2,645,502 | 7/1953 | Collins et al. | 280/47.38 X |
| 2,649,893 | 8/1953 | Spriggs | 297/153 X |
| 2,984,291 | 5/1961 | Kostenborder et al. | 297/153 X |
| 3,188,662 | 6/1965 | Watson | 297/3 X |
| 3,223,432 | 12/1965 | Nicolaci | 280/79.2 |
| 3,330,597 | 7/1967 | Lay et al. | 297/148 |
| 3,524,655 | 8/1970 | Ballenger | 280/47.38 |
| 3,567,275 | 3/1971 | Bakey | 297/148 X |

Primary Examiner—Roy D. Frazier
Assistant Examiner—William E. Lyddane

Attorney, Agent, or Firm—Dominik, Knechtel, Godula & Demeur

[57] ABSTRACT

A rugged rolling high chair for commercial duty, as in restaurants and cafeterias, in which preformed rigid tubular members are interconnected relative to a one piece molded seat member to obtain a stable assembly. An upper frame member is in the form of a closed loop having a front part, spaced side parts, and a forwardly tilting rear part, the rear part supportingly contacting the backrest of the molded seat and the side parts supportingly contacting the sides of the seat. Each of a unitary pair of leg members have front and rear legs connected by a top transverse portion which also supportingly contacts the sides of the molded seat. A cross brace spans aligned front legs of the unitary leg member and supportingly contacts the bottom of the one piece molded seat. A rigid crotch bar is joined to the cross brace and the front part of the upper frame member. A basket member has rigid peripheral rods to extend through mounting bores in the legs so that the basket is supported between the legs and further braces said legs when locking elements are affixed to the peripheral rods extending through the mounting bores.

12 Claims, 5 Drawing Figures

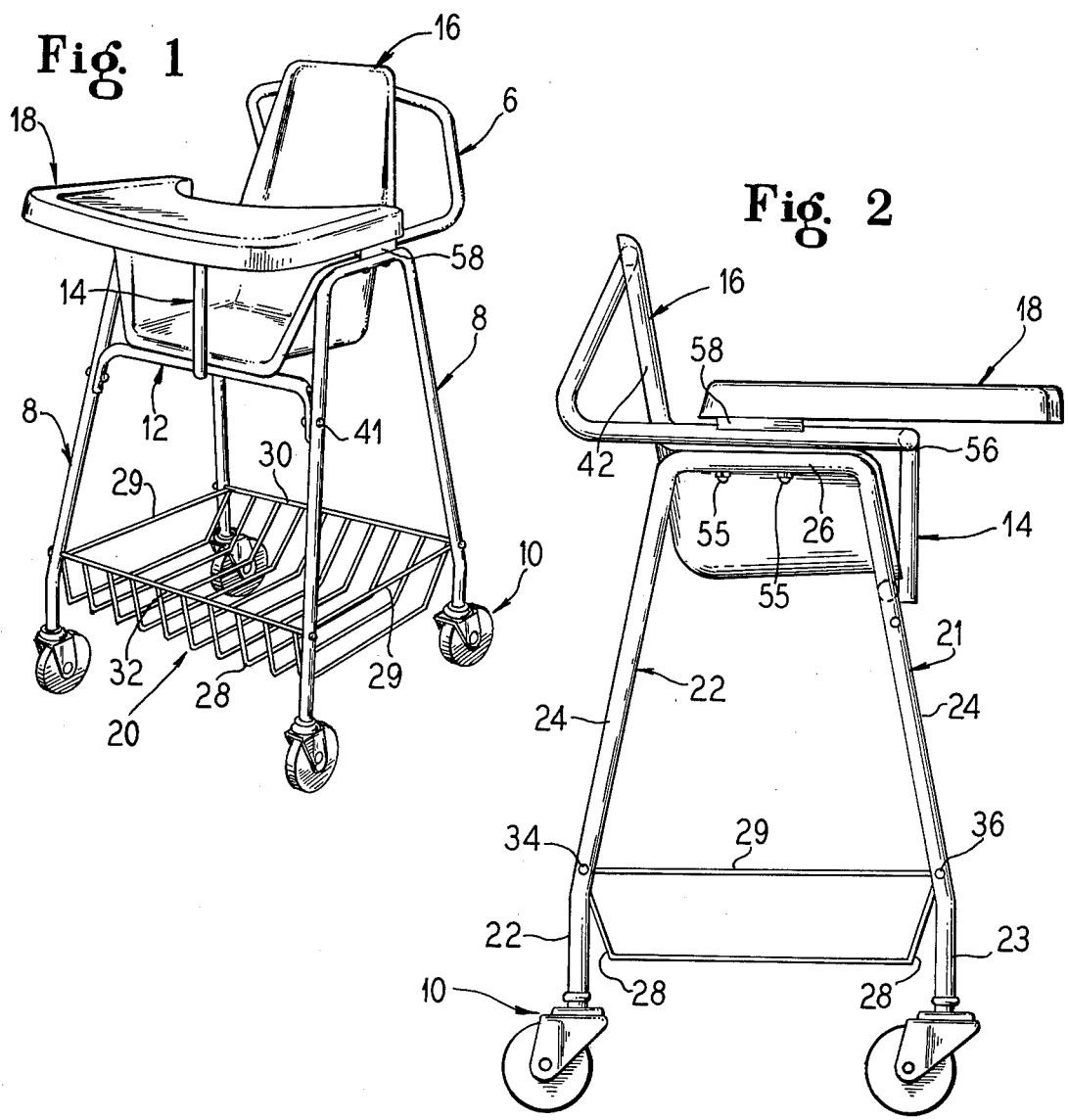
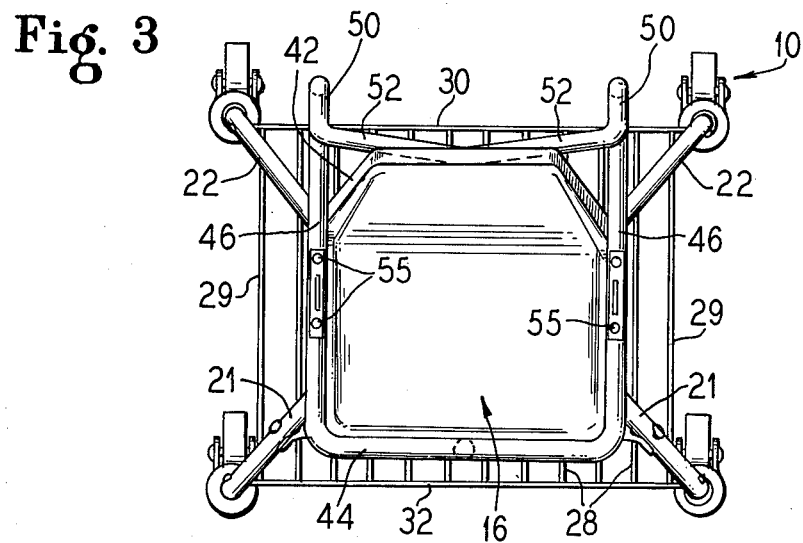

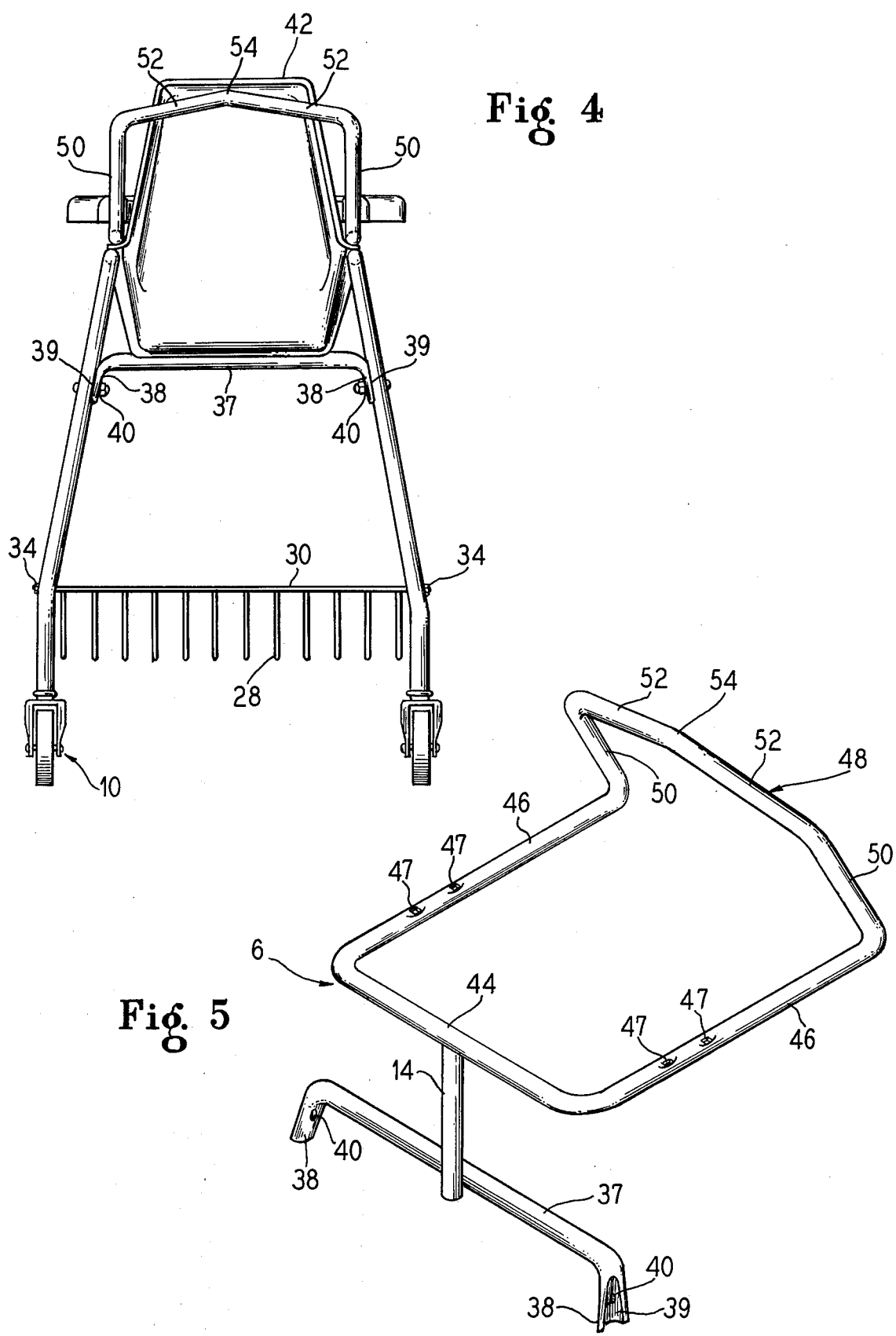

COMMERCIAL DUTY HIGH CHAIR

FIELD AND BACKGROUND OF THE INVENTION

This invention relates to a ruggedly constructed rolling high chair, designed particularly for use in commercial establishments. The invention particularly relates to such a chair in which relatively few frame members are cooperatively interconnected relative to a one piece molded seat and to a basket member so that said members are advantageously braced and interlocked relative to one another.

Rolling chairs, and particularly rolling high chairs, have been shown in the art as in U.S. Pat. No. 3,540,776 which discloses a specialty chair having an elongated seat for orthopedic infants. Generally, high chairs, strollers, and the like, are frequently constructed from rigid metal tubular frame members, and such chairs have been known to use one piece molded seats. A stroller incorporating such features is shown in U.S. Pat. No. 3,605,955, owned by the assignee of the present application. Other representative teachings may be found in U.S. Pat. Nos. 3,188,662 and 3,567,275. These and other teachings of the prior art generally disclose some of the features utilized in particularly improved manner in the present invention.

OBJECTS AND ADVANTAGES OF THE INVENTION

It is an object of the invention to provide a commercial duty rolling high chair of improved construction in which rigid tubular frame members are assembled relative to a one piece molded seat and a basket member so that the overall assembly is rugged and stable while realizing advantages in use.

Another object is a commercial duty rolling high chair which will have a long life, even under hard use, and which has little or no requirements of servicing, cleaning or upkeep.

Yet another object of the invention is a commercial duty and long life rolling high chair which utilizes a safe, rigid, crotch bar to retain the infant in a one piece molded seat, and which allows use of a tray member that is mounted substantially in advance of the seat to allow the high chair to be closely positioned to a table, counter, or the like.

Still yet another object of the invention is a commercial duty high chair of long life in which a relatively few number of preformed rigid tubular frame members can be quickly and easily assembled relative to a one piece molded seat and a basket member, so that said seat and basket member are supportedly contacted and additionally impart rigidity and stability to the assembly.

Yet still another object of the invention is a commercial duty high chair which can be placed in frequent use over substantially continuous periods of time, and in which preformed frame members have portions which are used to advantage for steering and pushing the high chair while still contributing to the support and stability of the assembly.

DESCRIPTION OF THE VIEWS OF THE DRAWINGS

Such objects and advantages are now attained, together with still other objects and advantages which will occur to practitioners, by the invention of the following disclosure which includes drawings wherein:

FIG. 1 is a perspective view of the improved high chair assembly.

FIG. 2 is a side elevational view of the high chair shown in FIG. 1, but on a slightly enlarged scale.

FIG. 3 is a top plan view of the rolling high chair.

FIG. 4 is a rear elevational view of the rolling high chair.

FIG. 5 is a perspective view of connected frame members, shown on an enlarged scale.

SUMMARY OF THE INVENTION

A one piece molded seat has skirt portions along the edge, which may be continuous, and which are formed on a radius to engage rigid tubular frame portions. An upper frame portion is in the form of a closed loop and includes spaced side parts which engage the top side or convex side of the skirt portion. Such skirt portion is sandwiched between the side parts and a transverse portion of a unitary leg member, the skirt portion being in secured relationship with the aid of fasteners. A rear part of the upper frame member is formed with a steering and pushing handle, and a part of said rear frame part additionally supportingly contacts a skirt portion at the top of the backrest of the one piece seat. The front part of the upper frame member is connected to a rigid crotch bar, and such crotch bar is also connected to a cross brace extending between two unitary leg members. Each unitary leg member has a generally inverted U-configuration, and the transverse or base portion of the U engagingly supports the underside or concave side of a skirt portion at the sides of the one piece molded seat. The side part of the upper frame member and the transverse portion of the unitary leg members, therefore, sandwich such skirt portion, and are secured thereto with fasteners.

A basket member is joined to the individual legs with the aid of rigid peripheral rods which extend through aligned mounting bores in an aligned pair of legs either at the side or at the front and back. One pair of spaced peripheral rods extend through said bores and the other pair are abutted against the tubular legs. The result is a securely mounted basket member which, additionally, imparts rigidity to the unitary leg members as well as the entire assembly.

DETAILED DESCRIPTION OF THE INVENTION

Referring first to the view of FIG. 1, there is generally seen an assembly having a continuous or looped upper frame member 6, which is tubular and cylindrical. A pair of spaced unitary leg members 8 are provided with mounted caster assemblies 10 at the bottom. A cross brace member 12 spans the aligned legs at the front and a rigid crotch bar 14 is shown connected to the cross brace and to the upper frame member. There is also present a one piece molded seat 16; a tray member 18; and a basket member 20 mounted to the legs.

Looking now at FIGS. 2 and 4, each unitary leg member 8 includes a front leg 21 and a rear leg 22. A minor length of the legs is shown as comprising a lower vertical portion 23 which merges into an upper angular portion 24. The angular portion comprises a major length of the legs, and said angular portions merge into a top connecting or transverse portion 26. The angular portions 24 of the leg are, therefore, seen to form an obtuse angle with the transverse portion 26. The general configuration of each unitary leg member is generally that of an inverted U.

The unitary leg members comprise one of the rigid tubular frame members of the high chair and are preferably preformed from heavy duty tubular steel. The caster assemblies 10 are fitted into the bottoms of the legs in the usual way, and further details of the caster assemblies or their mountings will not be described since such are conventional and do not otherwise comprise an essential part of the invention.

The basket member 20 is mounted to the legs, and such basket member is formed from a plurality of shaped rods 28 resembling a cross section of a flat bottom bowl with tapered sides. The top of the basket is defined by a pair of spaced side peripheral rods 29, a rear peripheral rod 30 and a front peripheral rod 32 spaced from the rear peripheral rod. The rear peripheral rod 30 extends beyond the periphery of the open top and the opposite ends pass through mounting bores in the aligned rear legs 24, such bores not being otherwise shown or identified by numeral. The ends of the rods extend beyond the aligned rear tubular legs, and rear fasteners 34 are mounted to the extending rod portions. Such fasteners may be simple frictional stop or lock nuts.

The front peripheral rod likewise extends through mounting bores in the aligned front legs, and receive front fasteners 36, similar to rear fasteners 34. The side peripheral rods 29 are slightly inboard and abut against the tubular legs when the front and rear fasteners are secured. The side rods and the fasteners are at diametrically opposite sides of a given leg. This arrangement, therefore, imparts stability to the four legs as well as mounting the basket member to the legs. It will be seen that the mounting bores, marked by the fasteners 34 and 36, are at about the junction between the vertical portions 23 and the angular portions 24 of the legs. It will further be seen that the mounting bores are all in a common plane which is substantially parallel to the support surface over which the caster assembly is rolled.

The aligned front legs of the unitary leg members are further stabilized by the cross brace 12 which includes a spanning member 37 having downturned feet 38 at the opposite ends. The outer sides of the feet are formed with concave seats 39, and such seats have a mounting bore 40. Fasteners 41 secure the cross brace between the aligned legs. The cross brace is positioned between the aligned front legs so it supportingly engages the front edge of the seat 16. Such seat is shown as having a continuous skirt 42 along its edges, and such skirt is formed on a radius to facilitate seating and supporting engagement with tubular frame members or portions. The concave or inside curve of the skirt portion follows the cylindrical tubular configuration when seated.

The upper looped frame member 6, best seen in FIG. 5, is used to particular advantage in the assembly. Such frame member is of cylindrical configuration like the unitary leg members and the crotch bar. The upper frame member has a front part 44 which opposite ends join spaced side parts 46. The side parts have mounting bores 47 which are placed in registry with mounting bores in the transverse portions 26 of the unitary leg members (not otherwise shown or identified).

The loop of the upper frame member is closed by a forwardly tilted rear part 48 which has steering and pushing handle portions 50. The side parts extend beyond the backrest of the seat, and the lower ends of the handles are joined to the ends of the side parts. The handles join transverse top angular portions 52 at their upper ends. The angular portions 52 form an obtuse angle with the handle portions 50, and the angular portions 52 form a center apex 54 which supportingly engages skirt portion 42 at the top edge of the backrest of the one piece molded seat.

The handles and top angular portions of the rear frame part are shown as lying in a plane which forms an acute angle with the plane in which lie the side and front parts of the upper frame portion. It is required that at least some points on the handles and transverse portion commonly touch the plane which forms said actue angle.

It is seen that the continuous skirt portion 42 at the opposite sides of the seat is sandwiched between the side parts 46 and the top transverse portion 26 of the unitary leg members. Fasteners 55 are mounted in the bores 47 of the side parts and the registered bores in the transverse portion 26 of the unitary leg members. Fasteners and locking members are used to assembly the various frame portions to one another, except for the crotch bar 14 which is preferably joined to the front part of the upper frame member and the cross brace 12 by welds, one of which is shown at 56, see FIG. 2.

It is also seen in the view of FIG. 2 that the tray member 18 extends well in advance of the one piece molded seat, and this arrangement permits the chair to be pushed closely to a table, counter or the like. The usual release means 58 are provided at the undersides of the tray on opposite sides for being engaged and released to the side parts 46 of the upper frame member.

Various other features may be provided to improve the assembly. The basket member is preferably vinyl coated to prevent rust and to reduce likelihood of pain and injury after bodily impact. The various tubular frame members are preferably electrostatically powder coated with epoxy and then baked. The resulting tough coat prevents rusting and protects against cracking, while being non-toxic. The tray member is preferably molded from high density polyethylene which permits safe washing of the unit in a dishwasher. Other features of improvement will occur to practitioners.

The claims of the invention are now presented and the terms of such claims may be further understood by reference to the preceding specification and the views of the drawing.

What is claimed is:

1. A long life high chair with rollers, including
a one piece molded seat, a curved skirt portion at the edge of the seat,
a looped upper frame member, having spaced side parts connected by a front part and a forwardly tilted rear part, said rear part having steering and pushing handle portions, each of the handle lower ends joined to each of the side parts and each of the handle upper ends joined to a transverse top portion, said handle and transverse portions touching a plane which forms an acute angle with a plane common to the side and front parts,
spaced unitary leg members, each leg member having a front leg and a rear leg and a connecting portion joining the tops of the legs, a caster assembly mounted to the bottom of each leg, curved side skirt portions sandwiched between the side parts of the upper frame member and the top connecting portions of the leg members in secured relationship,
a cross brace spanning the pair of aligned front legs of the unitary leg members, said cross brace engaging a forward portion of said unitary molded seat, said means fastening said cross brace to said aligned front legs, said cross brace positioned to support a forward part of the unitary molded seat along the curved skirt portion, crotch retaining means to be secured between the central portions of said cross brace and said front part of the looped upper frame member, and a basket member having a plurality of rigid peripheral rods and each of a pair rods being secured to adjacent legs, whereby said basket is mounted between the leg members and further braces such leg members.

2. A long life high chair as in claim 1 wherein said crotch retaining means is a rigid tubular crotch bar secured to the substantially central portions of said cross brace and said front part of the looped upper frame member.

3. A long life high chair as in claim 2 wherein said side parts extend beyond a back rest of the one piece molded seat and said handle portions are aligned and tilt forwardly, said transverse portion supportingly contacting a curved skirt portion at the top of the one piece molded seat.

4. A long life high chair as in claim 3 wherein said steering and handle portions and said transverse portions lie in a common plane which forms said acute angle with the plane in which said side and front parts lie.

5. A long life high chair as in claim 4 wherein said cross brace has downturned feet at its opposite ends, and said feet having concave seats for engaging the tubular aligned front legs of the unitary leg members.

6. A long life high chair as in claim 5 wherein said basket member has a pair of spaced side peripheral rods and a pair of spaced front and rear peripheral rods which ends extend beyond the side peripheral rods, said aligned front legs having aligned mounting bores, and a pair of aligned rear legs having aligned mounting bores, all of said bores being common to a plane which is parallel to a support surface for the high chair, the extending ends of said front and rear peripheral rods passing through the respective aligned mounting bores and locking elements mounted to the ends of the peripheral rods extending out of the mounting passageways, said locking elements and side peripheral rods being on diametrically opposite sides of each leg.

7. A long life high chair as in claim 6, wherein a major length of said legs in each unitary leg member form obtuse angles with said transverse top portion and a minor length at the bottom is substantially vertical to a support surface for said high chair, said mounting bores positioned at about the junctions of said major and minor lengths.

8. A long life high chair as in claim 7 wherein the transverse portion of the rear part is formed by two angular portions which form obtuse angles with the tops of said handle portions, said transverse angular top portions forming an apex substantially at the midpoint of the skirt portion at the top of the backrest of the one piece molded seat.

9. A long life high chair with rollers, including a one piece molded seat having a seating part, spaced side parts and a back rest part, a curved skirt portion at the edge of the seat, a looped upper cylindrical frame member having spaced side parts connected by a front part and a forwardly tilted rear part, said rear part having spaced steering and pushing handle portions extending beyond the back rest part at each side part of the one piece molded seat, each of the steering and handle portions joined at their top ends to a transverse top portion, at least a part of said transverse portions supportingly engaging a portion of the back side of the back rest part, said side parts extending beyond said back rest part and joined to the bottoms of each of the steering and pushing handle portions, said steering and pushing handle portions and transverse portion touching a plane which forms an acute angle with a plane common to the side and front parts of the upper frame portion, said side support parts engaging in supporting relationship the skirt portion at the sides of the one piece molded seat, at least one pair of unitary leg members, each of said pair of unitary leg members formed by a front and rear leg portion and a top connecting portion, and said pair together forming aligned front legs and aligned rear legs, transverse bracing means connecting at least one pair of aligned legs of the unitary leg members.

10. A long life high chair as in claim 9 wherein the side parts of said upper cylindrical frame member contact the top of the curved skirt portion, and said top connecting portions of each unitary leg member contact the other side of the curved skirt portion and the side parts of said one piece molded seat, said curved skirt portion being sandwiched therebetween.

11. A long life high chair as in claim 10 wherein said transverse bracing means being between an aligned pair of legs includes a cross brace between the aligned pair of front legs, and said brace engaging the underside of the skirt portion at the front of the seat part.

12. A long life high chair as in claim 11 wherein said crotch retaining means is a rigid crotch bar fixed at its opposite ends to central portions to the front part of the upper tubular frame member and to the cross brace between the aligned pair of front legs of the unitary leg members.

* * * * *